US010545438B2

(12) United States Patent
Matsumoto et al.

(10) Patent No.: US 10,545,438 B2
(45) Date of Patent: Jan. 28, 2020

(54) IMAGE FORMING APPARATUS

(71) Applicant: KYOCERA Document Solutions Inc., Osaka (JP)

(72) Inventors: Makoto Matsumoto, Osaka (JP); Kenji Miyamoto, Osaka (JP); Kazuhiro Tsubaki, Osaka (JP); Takuya Aritsuki, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/283,124

(22) Filed: Feb. 22, 2019

(65) Prior Publication Data

US 2019/0265618 A1    Aug. 29, 2019

(30) Foreign Application Priority Data

Feb. 26, 2018   (JP) .................. 2018-032415

(51) Int. Cl.
    *G03G 15/20*    (2006.01)
    *G07F 17/26*    (2006.01)
    *G03G 21/02*    (2006.01)

(52) U.S. Cl.
    CPC ..... *G03G 15/2039* (2013.01); *G03G 15/2064* (2013.01); *G03G 21/02* (2013.01); *G07F 17/26* (2013.01); *G03G 2215/00105* (2013.01)

(58) Field of Classification Search
None
See application file for complete search history.

(56) References Cited

U.S. PATENT DOCUMENTS

2014/0241747 A1    8/2014   Ito

FOREIGN PATENT DOCUMENTS

JP      2005215568 A  *  8/2005
JP      2014-164254 A    9/2014

* cited by examiner

*Primary Examiner* — Victor Verbitsky
(74) *Attorney, Agent, or Firm* — IP Business Solutions, LLC

(57) ABSTRACT

An image forming apparatus connected to a charging device includes an image forming unit, a fixing unit, a charge processor, a controller, and a printed sheet counter. The charge processor charges a fee for printing. The controller selects an energy saving mode, upon deciding that a balance of a deposited amount in the charging device is less than a threshold amount. The printed sheet counter counts the number of sheets of the recording medium printed by the image forming unit in one single printing job. The controller selects the energy saving mode for the next printing job, upon deciding that the number of sheets printed in one single printing job is less than a predetermined threshold number of sheets, when the deposit balance is remaining in the charging device.

5 Claims, 2 Drawing Sheets

IMAGE FORMING APPARATUS

INCORPORATION BY REFERENCE

This application claims priority to Japanese Patent Application No. 2018-032415 filed on Feb. 26, 2018, the entire contents of which are incorporated by reference herein.

BACKGROUND

The present disclosure relates to an image forming apparatus, and in particular to a technique to save energy by lowering the temperature of a fixing unit.

Existing image forming apparatuses include a multifunction peripheral (MFP) having a plurality of functions such as copying, printing, and facsimile transmission. Such a type of image forming apparatus consumes large power and therefore, these days, reduction in power consumption is required, and energy saving standards are becoming more and more severe with time.

The power consumption by a fixing unit occupies a large portion of the power consumption of an MFP. For example, when a paper cassette is designed to accept 500 sheets of recording papers, the temperature of the fixing unit has to be set to a higher level, to prevent imperfect fixing even though 500 sheets are printed in one single printing job. While lowering the temperature of the fixing unit may lead to reduction in energy consumption, imperfect fixing may be incurred, when the temperature of the fixing unit is low.

To minimize the mentioned drawback, many of the existing image forming apparatuses are configured to perform the printing in an energy saving mode, in which the recording sheet is transported at a lower speed so that it takes a longer time for the recording sheet to pass the fixing unit, to thereby prevent imperfect fixing.

Here, when the recording sheet passes the fixing unit, the temperature of the fixing unit is removed by the recording sheet, and thus the temperature of the fixing unit is lowered. Accordingly, when a large number of sheets are printed in one single printing job, the temperature of the fixing unit is significantly lowered, and it becomes difficult to maintain the temperature of the fixing unit at a level required for the fixing. On the contrary, when only a small number of sheets are printed in one single printing job, the temperature required for the fixing can be maintained.

Accordingly, the mentioned image forming apparatus is configured to learn, in advance, the number of sheets printed in one single printing job, with respect to a section to which a user belongs, or to each of the users, and determine the setting for the energy saving printing, according to information of the number of sheets to be printed, acquired through the learning. For example, reducing the transport speed of the recording sheet by a smaller rate contributes to maintaining the productivity, which is desirable to the user. Therefore, the image forming apparatus only slightly reduces the transport speed of the recording sheet, when the number of sheets to be printed in one single printing job is small.

SUMMARY

The disclosure proposes further improvement of the foregoing technique.

In an aspect, the disclosure provides an image forming apparatus configured to be connected to a charging device that charges a fee according to an operation related to printing. The image forming apparatus includes an image forming unit, a fixing unit, a charge processor, a controller, and a printed sheet counter. The image forming unit forms a toner image on a recording medium. The fixing unit fixes the toner image on the recording medium, by heating and pressing the recording medium on which the toner image has been formed by the image forming unit. The charge processor charges the fee for printing, and manages a balance of a deposited amount in the charging device. The controller (i) sets a printing mode, upon deciding that the deposit balance in the charging device is not less than a predetermined threshold amount, to a normal mode in which a temperature of the fixing unit is set to a predetermined first temperature that allows execution of a normal printing operation, and (ii) sets the printing mode, upon deciding that the deposit balance is less than the predetermined threshold amount, to an energy saving mode in which the temperature of the fixing unit is set to a predetermined second temperature lower than the first temperature. The printed sheet counter counts a number of sheets of the recording medium printed by the image forming unit in one single printing job. The controller sets the printing mode for a next printing job to the energy saving mode, upon deciding that the number of sheets in the one single printing job counted by the printed sheet counter is less than a predetermined threshold number of sheets, when the deposit balance is remaining in the charging device.

DETAILED DESCRIPTION

Figure 1:
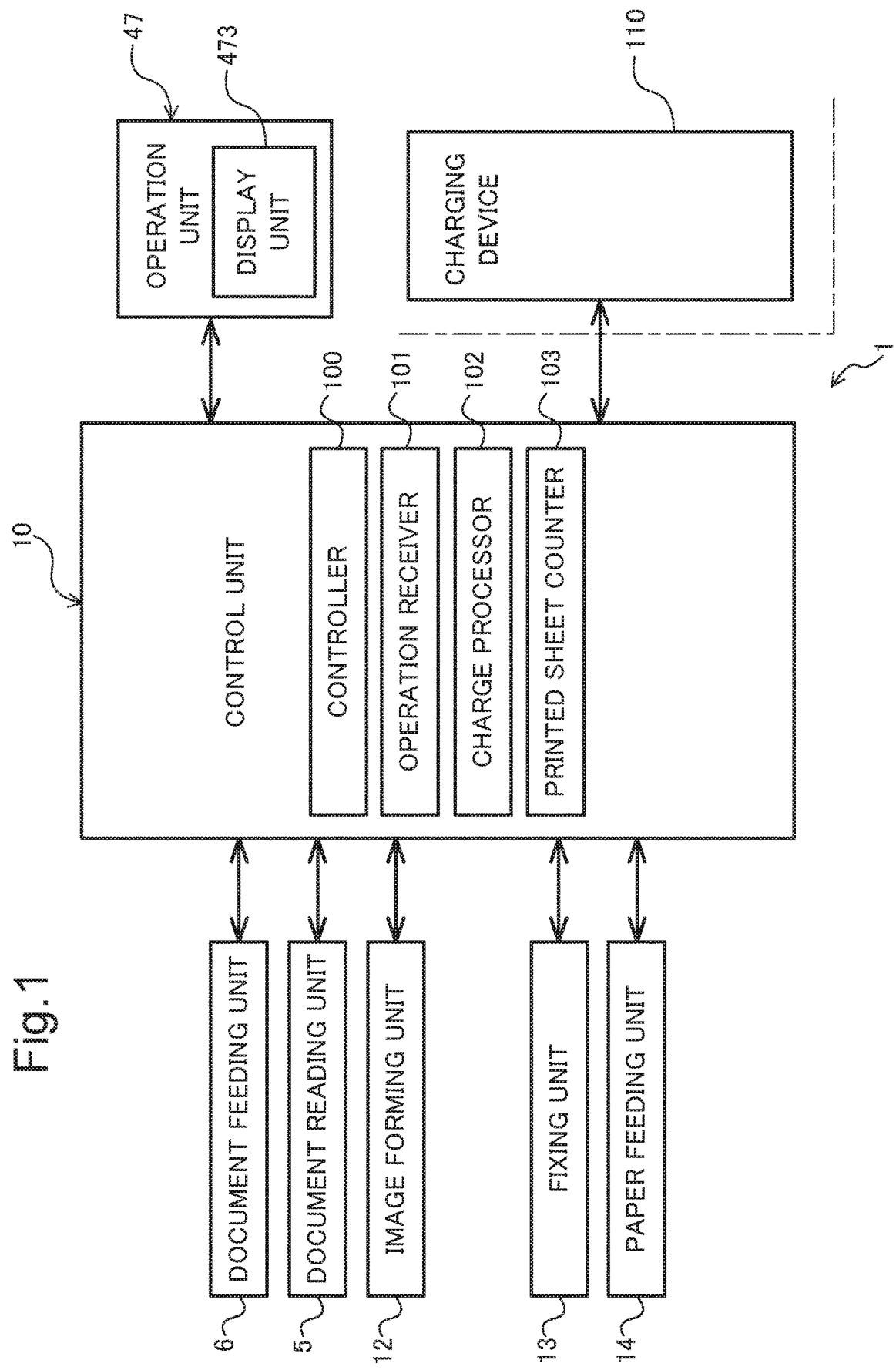
FIG. 1 is a functional block diagram showing an essential internal configuration of an image forming apparatus according to an embodiment of the disclosure.

Hereafter, an image forming apparatus according to an embodiment of the disclosure will be described, with reference to the drawings. FIG. 1 is a functional block diagram showing an essential internal configuration of an image forming apparatus according to an embodiment of the disclosure the disclosure.

The image forming apparatus 1 is a multifunction peripheral having a plurality of functions, such as copying, printing, scanning, and facsimile transmission. The image forming apparatus 1 includes a control unit 10, a document feeding unit 6, a document reading unit 5, an image forming unit 12, a fixing unit 13, a paper feeding unit 14, and an operation unit 47. In addition, the image forming apparatus 1 is configured to accept connection of a charging device 110.

The charging device 110 (e.g., a coin vendor) is a known device configured to charge and collect the fee for the printing. The charging device 110 includes a mechanism composed of a non-illustrated money inlet, a payment sensor for detecting that money has been inserted, a money distinction sensor for identifying the type of the money that has been inserted, a balance display unit, and a money return slot. The charging device 110 is configured to, for example, identify a paid amount, charge the fee by subtracting an amount from the paid amount (according to an instruction from the charge processor 102 to be subsequently described), according to an executed printing job, and recognize a deposit balance remaining after the charging. Here, the charging device 110 operates under the control of the image forming apparatus 1.

To perform the document reading operation, the image forming apparatus 1 operates as follows. The document reading unit 5 optically reads the image on a source document delivered from the document feeding unit 6 or placed on a non-illustrated contact glass, and generates image data. The image data generated by the document reading unit 5 is stored, for example, in a non-illustrated image memory.

To perform the image forming operation, the image forming apparatus 1 operates as follows. The image forming unit 12 forms a toner image on a recording sheet, serving as a recording medium and delivered from the paper feeding unit 14, on the basis of the image data generated by the document reading operation, or image data received from the computer connected to the network, which is an example of an external device.

The fixing unit 13 heats and presses the recording medium on which the toner image has been formed by the image forming unit 12, to thereby fix the toner image on the recording sheet. The recording sheet that has undergone the fixing process is discharged to an output tray. The paper feeding unit 14 includes a paper feed cassette.

The operation unit 47 receives instructions from the user to execute the functions and operations that the image forming apparatus 1 is configured to perform, for example the image forming operation. The operation unit 47 includes a display unit 473 for displaying, for example, an operation guide for the user. The display unit 473 is set up as a touch panel, so that the user can operate the image forming apparatus 1 by touching buttons and keys displayed on the screen.

The control unit 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control unit 10 includes a controller 100, an operation receiver 101, a charge processor 102, and a printed sheet counter 103.

The control unit 10 acts as the controller 100, the operation receiver 101, the charge processor 102, and the printed sheet counter 103, when the processor executes a control program stored in a non-illustrated hard disk drive (HDD). Here, the controller 100 and other components may each be constituted in the form of a hardware circuit, instead of being performed according to the control program. This also applies to other embodiments, unless otherwise specifically noted.

The controller 100 serves to control the overall operation of the image forming apparatus 1. The controller 100 is connected to the document feeding unit 6, the document reading unit 5, the image forming unit 12, the fixing unit 13, the paper feeding unit 14, the operation unit 47, and the charging device 110, and controls the operation of the mentioned components. For example, when the operation receiver 101 receives an instruction to execute one of the functions of the image forming apparatus 1, the controller 100 executes the designated function. In addition, the controller 100 selects the printing mode between a normal mode and an energy saving mode, depending on the operation status of the image forming apparatus 1.

The operation receiver 101 receives the inputs made by the user through the operation unit 47.

The charge processor 102 charges the fee for the printing, and manages the deposit balance in the charging device 110. For example, when the operation receiver 101 receives a request for printing, the charge processor 102 transmits a signal requesting to count up the charge according to the detail of the printing job, to the charging device 110.

The printed sheet counter 103 counts a number of sheets N of the recording medium printed by the image forming unit 12 in one single printing job. For example, the printed sheet counter 103 increases the number of sheets N by one, each time the image forming unit 12 forms the toner image on one recording medium.

Referring now to the flowchart shown in FIG. 2, an example of the operation, performed by the control unit 10 of the image forming apparatus 1 according to the embodiment, will be described hereunder. The operation referred to hereunder starts from the time point that the charging device 110 has transmitted, upon receipt of money inserted therein, a signal indicating that the insertion of the money has been detected, as well as information indicating the deposited amount, to the image forming apparatus 1, and the image forming apparatus 1 has recognized that the money has been inserted in the charging device 110. The information indicating the deposited amount, transmitted from the charging device 110, is managed by the charge processor 102 as balance information.

The controller 100 decides, upon recognizing the amount of the inserted money on the basis of the signal outputted from the charging device 110, whether the amount in the charging device 110 (i.e., a deposit balance M indicated by the balance information managed by the charge processor 102) is less than a predetermined threshold amount M1 (S1). The threshold amount M1 is set such that the number of sheets that can be printed with the threshold amount M1 becomes equal to a threshold number of sheets N1 to be subsequently described (predetermined number of sheets that can be printed in one single printing job, without incurring imperfect fixing despite the fixing temperature being set for the energy saving mode). For example, when the threshold number of sheets N1 is 10, and the unit price to be charged is 10 yen per sheet, the threshold amount M1 is set to 100 yen.

Upon deciding that the deposit balance M is not less than the threshold amount M1 (NO at S1), the controller 100 sets the printing mode to the normal mode, in which the temperature of the fixing unit 13 is set to a predetermined first temperature T1 that allows the execution of the normal printing operation (S2).

In contrast, upon deciding that the deposit balance M is less than the threshold amount M1 (YES at S1), the controller 100 sets the printing mode to the energy saving mode, in which the temperature of the fixing unit 13 is set to a predetermined second temperature T2, lower than the first temperature T1 (S3).

In other words, upon deciding that the deposit balance M at the time that money has been inserted in the charging device 110 is not less than the threshold amount M1 (i.e., the number of sheets that can be printed is not small), the controller 100 sets the printing mode to the normal mode, and upon deciding that the deposit balance M is less than the threshold amount M1 (i.e., the number of sheets that can be printed is small), the controller 100 sets the printing mode to the energy saving mode.

Then the controller 100 executes the printing job, by controlling the operation of the image forming unit 12 according to the printing request from the user received by the operation receiver 101 (S4). The printed sheet counter 103 counts up the number of sheets N, each time the image forming unit 12 has formed the toner image on one recording medium (S5). The controller 100 then decides whether the printing job has finished (S6).

In the case where the controller 100 decides that the printing job has not finished yet (NO at S6), the operation returns to S4. In contrast, upon deciding that the printing job has finished (YES at S6), the controller 100 decides whether any deposit balance is remaining in the charging device 110, according to the balance information managed by the charge processor 102 (S7).

In the case where the controller 100 decides that there is no deposit balance in the charging device 110 (NO at S7), the operation is finished. In contrast, upon deciding that there is a deposit balance in the charging device 110 (YES at S7), the controller 100 printed decides whether the number of sheets N in one single printing job, measured by the sheet counter 103 at S5, is less than the predetermined threshold number of sheets N1 (e.g., 10 sheets) (S8).

In the case where the controller 100 decides that the number of sheets N is less than the threshold number of sheets N1 (i.e., the number of sheets printed during the current printing job was small) (YES at S8), the operation returns to S3, where the printing mode is set to the energy saving mode (S3).

To an image forming apparatus, for example installed in a convenience store for use by many and unspecified users, normally a charging device (coin vendor) is connected. The charging device serves to accept insertion of money, recognize the deposited amount, and collect the fee according to the detail of the printing job. In addition, the image forming apparatus to which the charging device is connected executes the printing operation, according to the amount deposited in the charging device. For example, when the printing charge is 10 yen per sheet and a deposited amount of 100 yen is remaining in the charging device, the number of sheets that can be printed is 10 sheets. Therefore, the image forming apparatus can still forecast the number of sheets that can be printed thereafter, on the basis of the deposit balance in the charging device, despite the image forming apparatus being installed for use by many and unspecified users.

When the deposited amount in the charging device is relatively high, it can be assumed that the printing job is about to be executed a plurality of times. For example, in the case where the user inserts 500 yen in the charging device and sets the number of copies to eight, when the printing charge is 10 yen per sheet, it can be assumed that the copying will be performed twice to six times under the setting of eight copies per document, because the number of copies is very likely to be set to the same number, when the printing job is to be executed a plurality of times. In other words, it can be assumed that the number of sheets to be printed in the next printing job is very likely to be the same as the number of sheets to be printed in the immediately preceding printing job.

As described above, when the printing jobs are to be consecutively executed with the deposited amount remaining in the charging device 110, it can be assumed that the number of sheets to be printed in the next printing job is very likely to be the same as the number of sheets to be printed in the immediately preceding printing job. Accordingly, when the deposit balance is remaining in the charging device 110 (YES at S7), and also the number of sheets N is less than the threshold number of sheets N1 (i.e., the number of sheets to be printed is small) (YES at S8), it can be assumed that the number of sheets to be printed in the next printing job is small, in other words, that the printing job will be executed for the number of sheets that the deposit balance can afford. Therefore, the controller 100 sets the printing mode to the energy saving mode (S3).

Actually, however, the number of printed sheets may increase against the mentioned forecast, and resultantly the temperature of the fixing unit 13 may be significantly lowered. Therefore, the controller 100 switches the printing mode from the energy saving mode to the normal mode, upon deciding, on the basis of the information acquired from a fixing temperature sensor (e.g., thermistor) that detects the temperature of the fixing unit 13, that the temperature thereof has dropped below a predetermined threshold temperature. After switching the printing mode from the energy saving mode to the normal mode, the controller 100 suspends the printing job until the temperature of the fixing unit 13 reaches the first temperature T1. Therefore, occurrence of imperfect fixing can be avoided, though in exchange for a compromise in productivity.

In contrast, in the case where the controller 100 decides at S8 that the number of sheets N is not less than the threshold number of sheets N1 (i.e., the number of sheets to be printed is not small) (NO at S8), the operation returns to S1, where the controller 100 decides whether the deposit balance M in the charging device 110 is less than the threshold amount M1, on the basis of the balance information managed by the charge processor 102 (S1).

Upon deciding that the deposit balance M is not less than the threshold amount M1 (NO at S1), the controller 100 sets the printing mode to the normal mode (S2). In contrast, upon deciding that the deposit balance M is less than the threshold amount M1 (YES at S1), the controller 100 sets the printing mode to the energy saving mode (S3).

Thus, despite deciding that the number of sheets N in one single printing job, measured by the printed sheet counter 103, is not less than the threshold number of sheets N1 (NO at S8), the controller 100 sets the printing mode to the energy saving mode, provided that the deposit balance M at the time that the printing job has finished is decided to be less than the threshold amount M1 (i.e., the number of sheets that can be printed is small) (YES at S1) (S3).

With the arrangement according to the foregoing embodiment, the printing mode is set to the energy saving mode in which the temperature of the fixing unit 13 is lowered, when it is decided that the deposit balance M in the charging device 110 is less than the threshold amount M1 (i.e., the number of sheets that can be printed is small), or that the number of printed sheets N in the immediately preceding printing job is less than the threshold number of sheets N1 (i.e., the number of sheets to be printed in the next printing job is likely to be small).

Accordingly, the printing mode is set to the energy saving mode, when it is assumed that the number of sheets to be printed in one single printing job is small (when the temperature of the fixing unit 13 is assumed to be maintained at the level required for the fixing, despite lowering the temperature of the fixing unit 13 to a certain extent). Therefore, the printing job can be executed in the energy saving mode with the temperature of the fixing unit 13 lowered, yet so as to prevent occurrence of imperfect fixing.

The existing image forming apparatus referred to above as background art is intended for use by specific users, and therefore learning the number of sheets printed in one single printing job in advance is useful for the subsequent printing jobs. However, when the MFP is installed, for example, in a convenience store for use by many and unspecified users, learning the number of sheets printed in one single printing job does not make much sense, for the subsequent printing jobs.

With the arrangement according to the foregoing embodiment, in contrast, the printing job can be executed in the energy saving mode with the temperature of the fixing unit lowered, yet so as to prevent occurrence of imperfect fixing, even in such a circumstance where many and unspecified users utilize the MFP.

In addition, the number of sheets to be printed is forecasted on the basis of the balance of the deposited amount in the charging device and the number of sheets previously printed. Accordingly, provided that the user is about to consecutively execute the printing job, the number of sheets to be printed next by the user can be forecasted, without limitation to specific users. Consequently, even in a circumstance where many and unspecified users utilize the MFP, the printing job can be executed in the energy saving mode with the temperature of the fixing unit lowered, yet so as to prevent occurrence of imperfect fixing in the subsequent printing jobs, provided that the user is about to consecutively execute the printing job.

Further, the number of sheets to be printed can be forecasted when the money is inserted in the charging device 110, before the user inputs the number of copies through the operation unit 47. Accordingly, the printing mode can be switched from the normal mode to the energy saving mode at an early stage, which leads to earlier start of operation with reduced energy consumption. Further, also in the case of switching to the normal mode depending on the forecast of the number of sheets to be printed, the printing job in the normal mode can be started earlier, which leads to improved productivity.

The disclosure may be modified in various manners, without limitation to the foregoing embodiment. Although the embodiment takes up the MFP as an example of the image forming apparatus according to the disclosure, the disclosure is also applicable to various other image forming apparatuses, such as copiers and printers.

Figure 2:
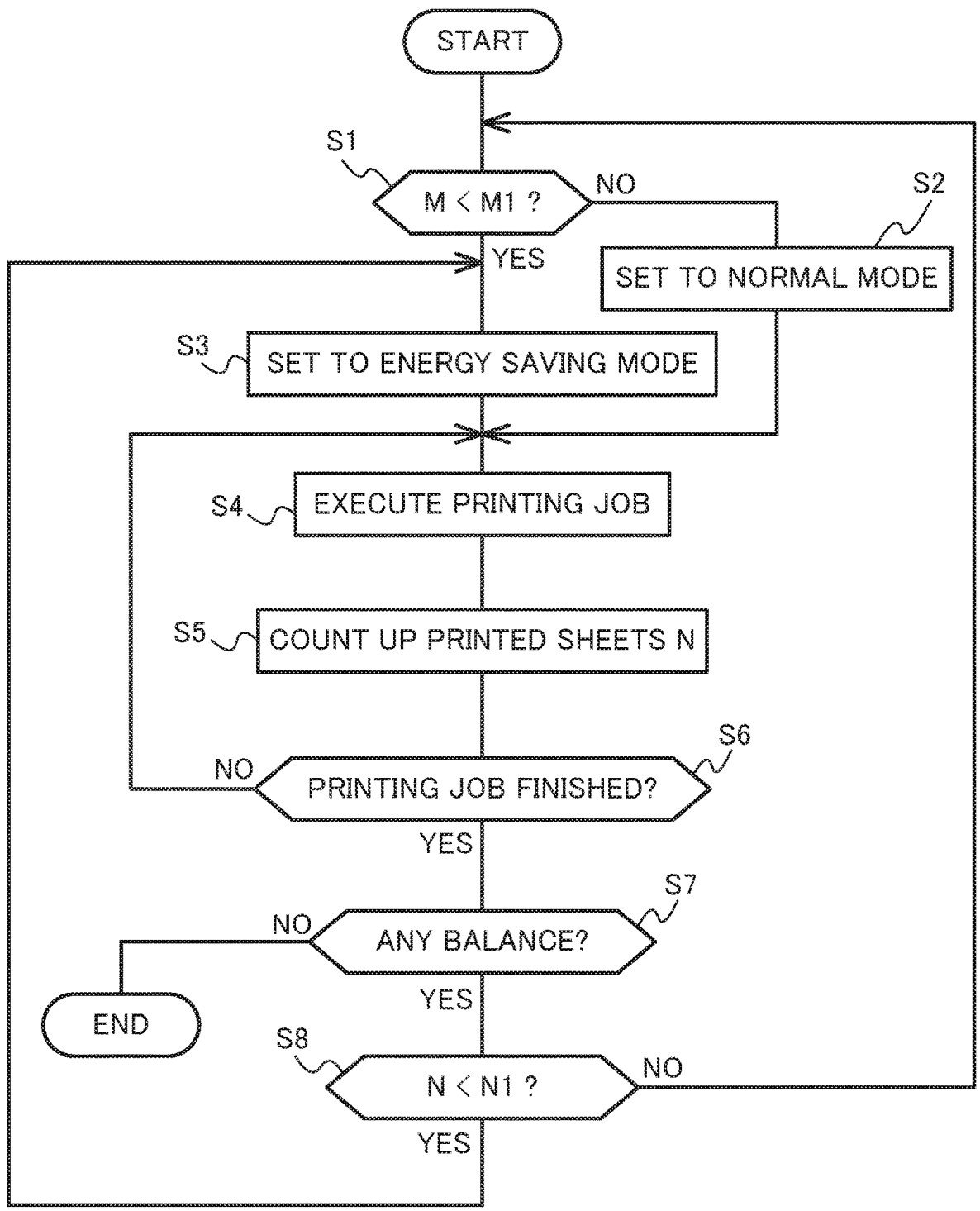
FIG. 2 is a flowchart showing an operation performed by a control unit of the image forming apparatus according to the embodiment.

The configurations and processings described with reference to FIG. 1 and FIG. 2 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus configured to be connected to a charging device that charges a fee according to an operation related to printing, the image forming apparatus comprising:
    an image forming unit that forms a toner image on a recording medium;
    a fixing unit that fixes the toner image on the recording medium, by heating and pressing the recording medium on which the toner image has been formed by the image forming unit;
    a charge processor that charges the fee for printing, and manages a deposit balance in the charging device;
    a controller that (i) sets a printing mode, upon deciding that the deposit balance in the charging device is not less than a predetermined threshold amount, to a normal mode in which a temperature of the fixing unit is set to a predetermined first temperature that allows execution of a normal printing operation, and (ii) sets the printing mode, upon deciding that the deposit balance is less than the predetermined threshold amount, to an energy saving mode in which the temperature of the fixing unit is set to a predetermined second temperature lower than the first temperature; and
    a printed sheet counter that counts a number of sheets of the recording medium printed by the image forming unit in one single printing job,
    wherein the controller further sets the printing mode for a next printing job to the energy saving mode, upon deciding that the number of sheets in the one single printing job counted by the printed sheet counter is less than a predetermined threshold number of sheets, when the deposit balance is remaining in the charging device.

2. The image forming apparatus according to claim 1, wherein the threshold amount is set such that the number of sheets that can be printed within the threshold amount becomes equal to the threshold number of sheets.

3. The image forming apparatus according to claim 1, wherein the controller sets the printing mode to the normal mode, upon deciding that the deposit balance at a time that money has been inserted in the charging device is not less than the threshold amount, and sets the printing mode to the energy saving mode, upon deciding that the deposit balance is less than the threshold amount.

4. The image forming apparatus according to claim 3, wherein, despite deciding that the number of sheets to be printed in one single printing job, measured by the printed sheet counter, is not less than the threshold number of sheets, the controller sets the printing mode to the energy saving mode for a next printing job, upon deciding that the deposit balance at a time that the printing job is finished is less than the threshold amount.

5. The image forming apparatus according to claim 1, further comprising a fixing temperature sensor that detects a temperature of the fixing unit,
    wherein the controller switches the printing mode from the energy saving mode to the normal mode, upon deciding, on a basis of information acquired from the fixing temperature sensor, that the temperature of the fixing unit has dropped below a predetermined threshold temperature, and suspends the printing job until the temperature of the fixing unit reaches the first temperature, after switching the printing mode from the energy saving mode to the normal mode.

* * * * *